(12) United States Patent
Hsu

(10) Patent No.: US 6,622,532 B2
(45) Date of Patent: Sep. 23, 2003

(54) CABLE LOCK ASSEMBLY

(76) Inventor: Ching-Shu Hsu, No. 98, Yung-Cheng, N. Rd., Taiping City, Taichung Hsien (TW)

( * ) Notice: Subject to any disclaimer, the term of this patent is extended or adjusted under 35 U.S.C. 154(b) by 0 days.

(21) Appl. No.: 10/059,747

(22) Filed: Jan. 28, 2002

(65) Prior Publication Data

US 2003/0140662 A1 Jul. 31, 2003

(51) Int. Cl.[7] .............................................. E05B 73/00
(52) U.S. Cl. ...................... 70/14; 70/18; 70/19; 70/58; 248/316.4; 248/553
(58) Field of Search ................ 70/14, 18, 19, 70/58, 62; 248/553, 316.4, 231.41, 74.4

(56) References Cited

U.S. PATENT DOCUMENTS

| | | | | |
|---|---|---|---|---|
| 3,370,446 A | * | 2/1968 | Francis | |
| 3,461,696 A | * | 8/1969 | Seka | |
| 4,064,714 A | * | 12/1977 | Treslo | 70/18 |
| 4,212,175 A | * | 7/1980 | Zakow | 70/58 |
| 5,154,072 A | * | 10/1992 | Leyden | 70/18 |
| 5,255,544 A | * | 10/1993 | Wu | 70/209 |
| 5,881,582 A | * | 3/1999 | Monaco | 70/14 |
| 6,105,922 A | * | 8/2000 | Derman | 248/551 |
| 6,182,481 B1 | * | 2/2001 | Nagy | 70/58 |
| 6,227,502 B1 | * | 5/2001 | Derman | 248/74.4 |
| 6,244,082 B1 | * | 6/2001 | Avganim | 70/58 |

* cited by examiner

Primary Examiner—Lloyd A. Gall
(74) Attorney, Agent, or Firm—Alan D. Kamrath; Rider Bennett, LLP

(57) ABSTRACT

A cable lock assembly has a base, a cylinder, a cable and a cord holder. The base is adapted to be attached to the computer with a fastener. The cylinder is mounted on the base and has a lock unit, a keyhole and a lock post. The cable is detachably connected to the base with one end and locked by the lock post. The other end of the cable is used to loop around an object. The cord holder is detachably attached to the base and locked by the lock post to hold the cords of the computer. Consequently, the computer can be locked to an object with the cable lock assembly. The computer will not be stolen or inappropriately moved even if the cords of the computer are cut off or are pulled out from the computer.

16 Claims, 6 Drawing Sheets

CABLE LOCK ASSEMBLY

BACKGROUND OF THE INVENTION

1. Field of the Invention

The present invention relates to a cable lock assembly, and more particularly to cable lock assembly for a computer.

2. Description of Related Art

To prevent theft or unauthorized removal of a computer it is common to fit a cable lock to a computer to secure the computer to an object such as a desk. With reference to FIG. 6, a conventional cable lock (70) in accordance with the prior art comprises two half bodies (71,72), a lock device (not shown) and a cable (74). The half bodies (71,72) are engaged with each other. Multiple passages (73) are defined between the half bodies (71,72) for cords (80) connected to the computer and the cable (74) extending through the passages (73). Wherein, the cords (80) are used to connect the computer to an electrical power source. The lock device is mounted between the half bodies (71,72) to keep the half bodies (71,72) from being separated from each other. The cable (74) extends through one of the passages (73) and loops around an object. Consequently, the computer can be locked to the object with the conventional cable lock (70) to prevent the computer from being stolen or inappropriately moved.

However, the conventional cable lock (70) only can lock the cords (80) of the computer. If the cords (80) are cut off or pulled out from the computer, the computer can still be stolen or moved.

To overcome the shortcomings, the present invention tends to provide a cable lock assembly to mitigate or obviate the aforementioned problems.

SUMMARY OF THE INVENTION

The main objective of the invention is to provide a cable lock assembly for a computer to prevent the computer from being stolen or inappropriately moved. The cable lock assembly has a base, a cylinder, a cable and a cord holder. The base is adapted to be attached to the computer with a fastener. The cylinder is mounted on the base and has a lock unit, a keyhole and a lock post. The cable is detachably connected to the base with one end and locked by the lock post. The other end of the cable is used to loop around an object. The cord holder is detachably attached to the base and locked by the lock post to hold the cords of the computer. Consequently, the computer can be securely locked to an object with the cable lock assembly. Thus, the computer cannot be stolen or inappropriately moved even if the cords of the computer are cut off or are pulled out from the computer.

Other objects, advantages and novel features of the invention will become more apparent from the following detailed description when taken in conjunction with the accompanying drawings.

DETAILED DESCRIPTION OF PREFERRED EMBODIMENT

Figure 1:
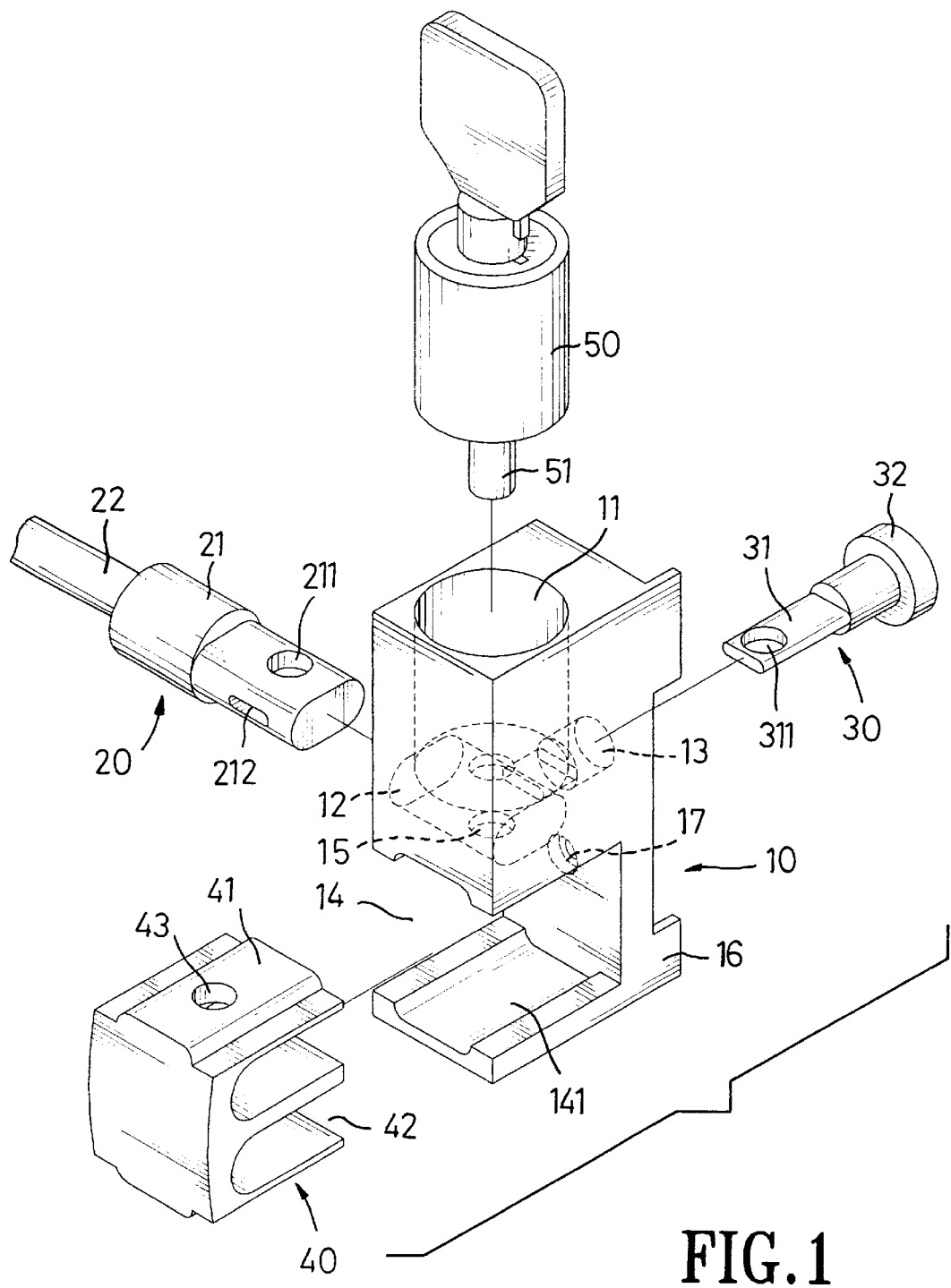
FIG. 1 is an exploded perspective view of a cable lock assembly in accordance with the present invention.
Figure 2:
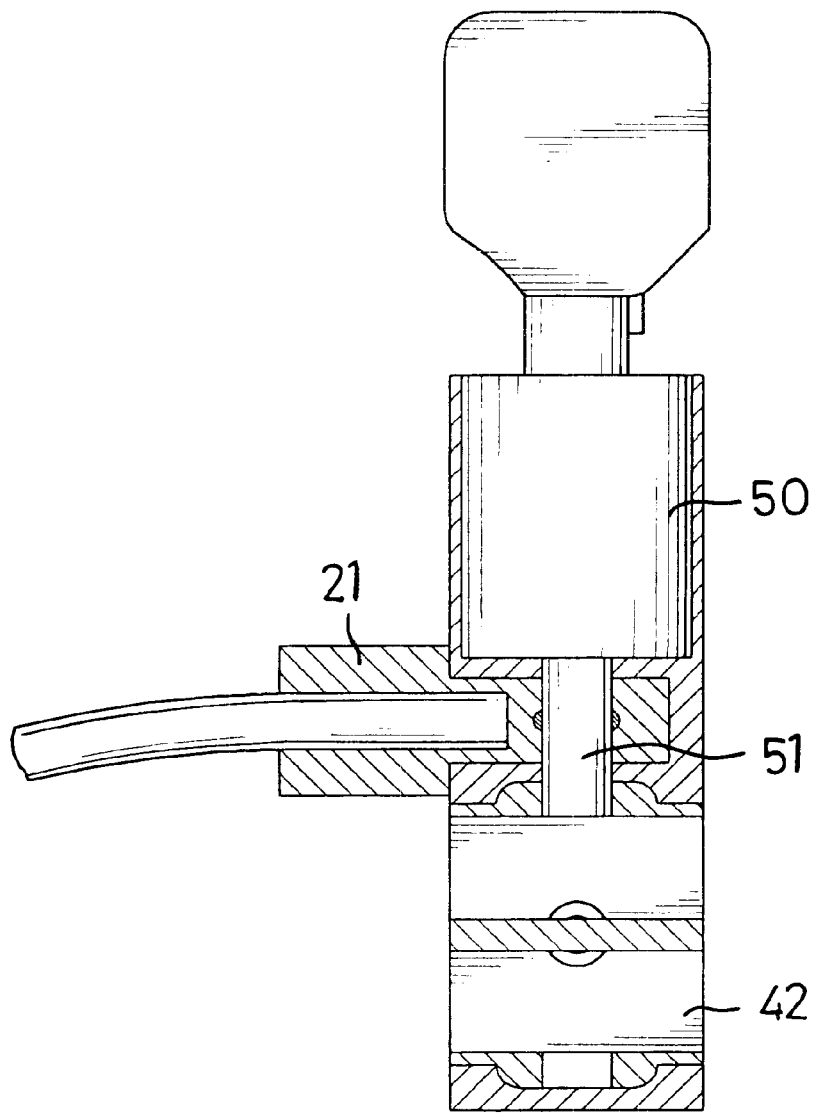
FIG. 2 is a side plan view in partial cross section of the cable lock assembly in FIG. 1.

With reference to FIGS. 1 and 2, a cable lock assembly in accordance with the present invention comprises a base (10), a cylinder (50), a cable (22) and a cord holder (40). The base (10) is adapted to be attached to a computer. Two ears (16) extend outward from an edge of the base (10) and are adapted to abut a side of the computer to keep the base (10) from rotating relative to the computer.

The cylinder (50) is received in a longitudinal hole (11) defined in the top of the base (10). The cylinder (50) has a lock post (51), a lock unit (not shown) and a keyhole. The lock post (51) is retractably mounted on the cylinder (50) at the end extending into the base (10). The lock unit is mounted in the cylinder (50) to lock or unlock the lock post (51). The keyhole is defined in the other end of the cylinder (50) apart from the lock post (51) and receives a key. Consequently, the user can lock or unlock the lock post (51) by the key and the lock unit.

Figure 3:
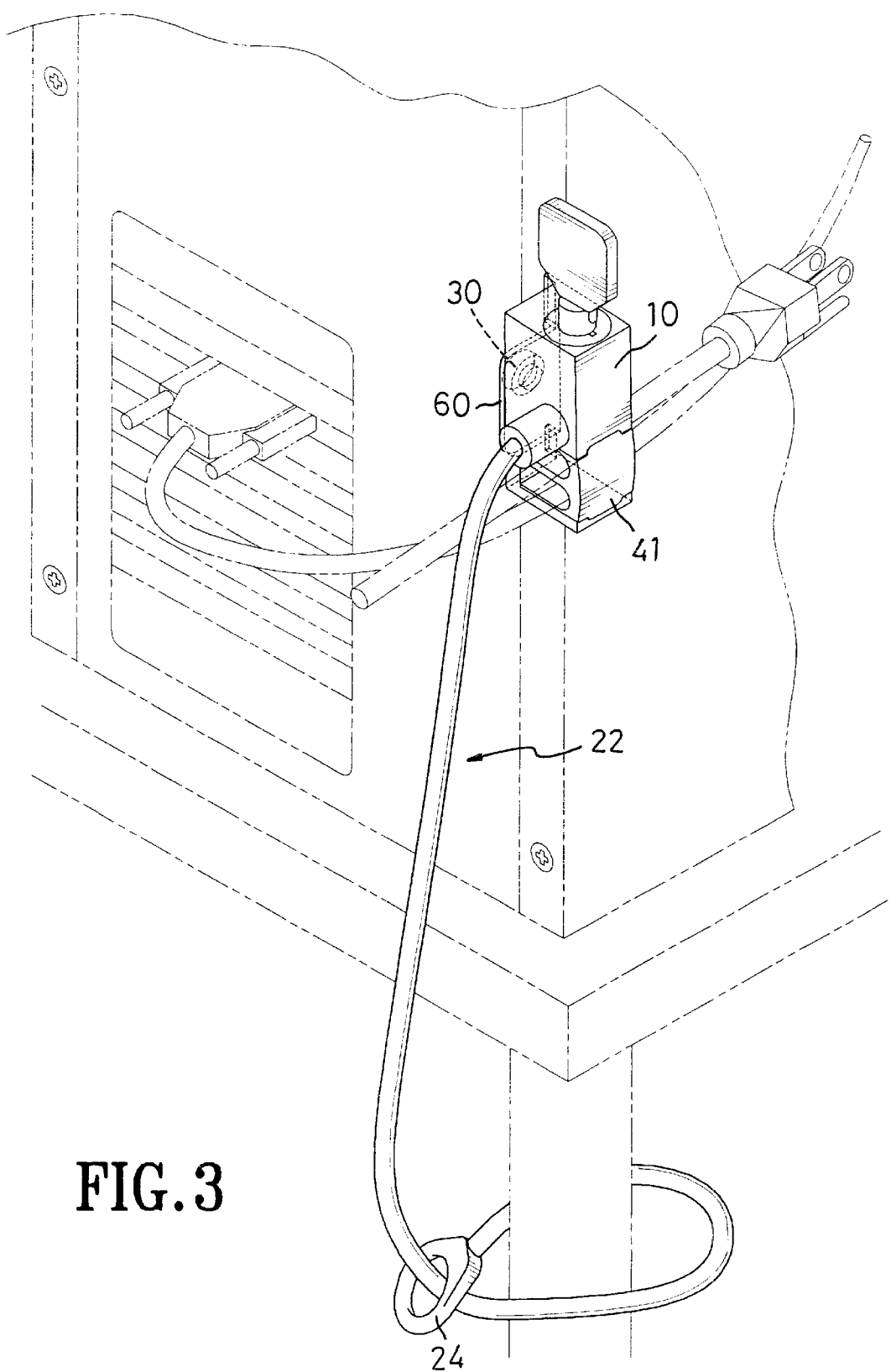
FIG. 3 is a perspective view showing that a computer is locked to a table with the cable lock assembly in FIG. 1.

The cable (22) is detachably connected to the base (10) with a first end and locked by the lock post (51). A loop (24) is mounted on the second end of the cable (22) for the first end of the cable (22) to extend through the loop (24) so as to loop around an object as shown in FIG. 3. A latch bolt (20) is mounted on the first end of the cable (22) to be inserted into the base (10) and locked by the lock post (51). A first lateral hole (12) is defined in a face of the base (10) to receive the latch bolt (20). The first lateral hole (12) is located below the longitudinal hole (11) and communicates with the longitudinal hole (11). A head (21) is formed on the latch bolt (20) at a position connected to the cable (22) to abut the face of the base (10) as the latch bolt (20) is inserted into the first lateral hole (12). A locking hole (211) is defined in the top of the latch bolt (20) and is aligned with the lock post (51) as the latch bolt (20) is inserted into the first lateral hole (12). Thus, the lock post (51) can extend into the locking hole (211) to securely hold the latch bolt (20) in the first lateral hole (12).

The cord holder (40) is detachably attached to the base (10) and locked by the lock post (51). A cavity (14) is defined in a side of the base (10) and extends through opposite faces of the base (10) to receive the cord holder (40). The cavity (14) is located below the first lateral hole (12) and communicates with the first lateral hole (12) with a passage (15) which aligns with the lock post (51). A locking hole (43) is defined in the top of the cord holder (40) and is aligned with the passage (15) as the cord holder (40) is inserted into the cavity (14). Thus, the cord holder (40) can be locked in the cavity (14) with the lock post (51) extending into the locking hole (43) in the cord holder (40). At least one notch (42) is defined in the cord holder (40) at a side facing the base (10) and extends through opposite faces of the cord holder (40). Accordingly, the cords of the computer can pass through cavity (14) in the base (10) and the notches (42) in the cord holder (40), and are securely held to the base (10) by the cord holder (40).

Two trails (141) are respectively defined in the top and the bottom ends of the inner surface of the cavity (14). A protrusion (41) protrudes from each respective end of the cord holder (40) and corresponds to one of the trails (141)

in the inner surface of the cavity (14). The trails (141) can provide a guiding effect and a limiting effect to the cord holder (40) as the cord holder (40) is inserted into the cavity (14).

Figure 4:
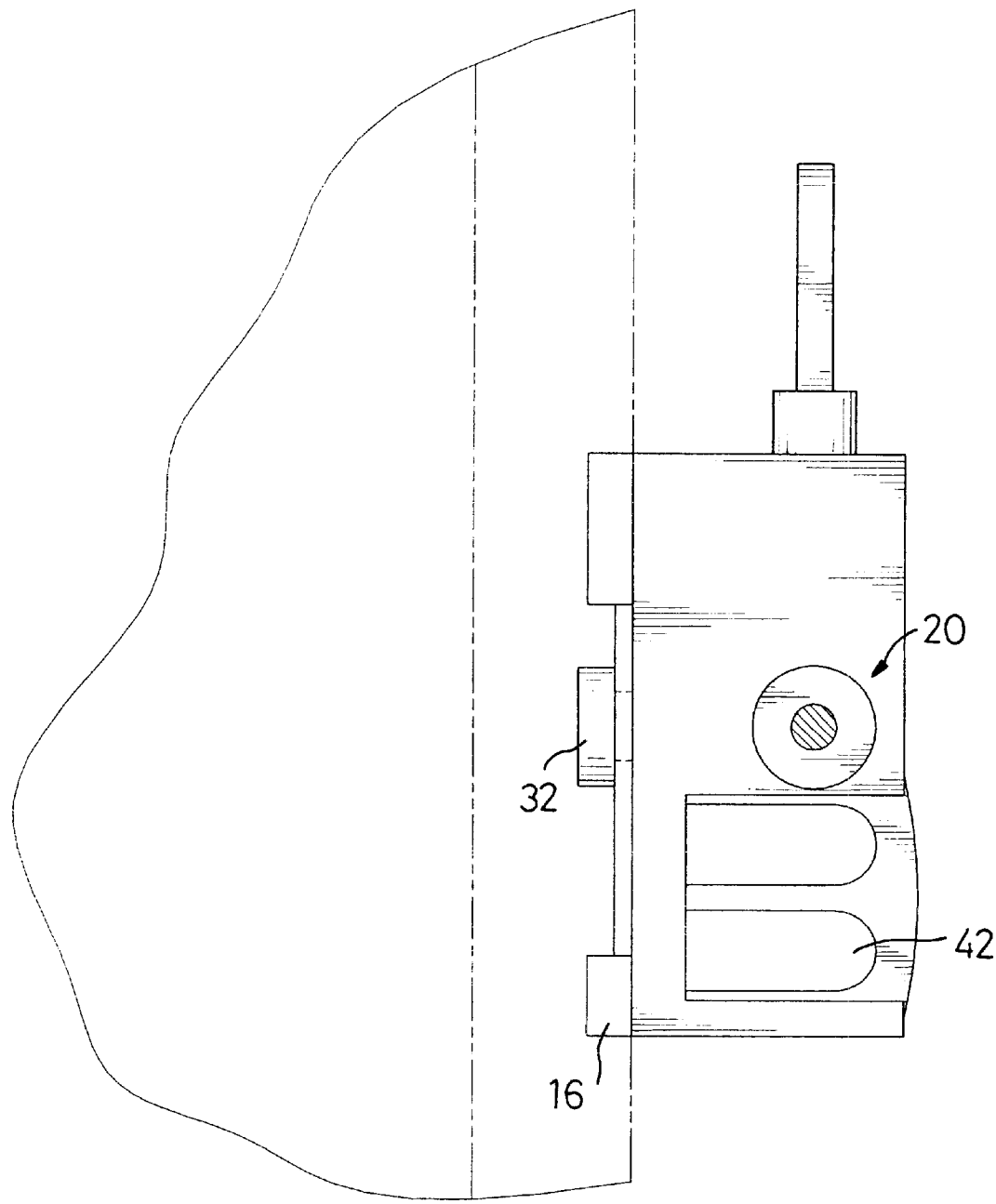
FIG. 4 is a side plan view of the cable lock assembly in FIG. 1 showing that the base is attached to a bracket of the computer with the fastener.

In addition, with reference to FIGS. 1, 3 and 4, the cable lock assembly further comprises a fastener (30) for securely attaching the base (10) to a bracket (60) on the computer. The fastener (30) comprises a head (32) and a stub (31). The stub (31) extends from the head (32), and a locking hole (311) is defined through the stub (31). A second lateral hole (13) is defined in a side of the base (10) and communicates with the first lateral hole (12). A third lateral hole (212) is defined in a side of the latch bolt (20) and communicates with the locking hole (211) in the latch bolt (20). The third lateral hole (212) is aligned with the second lateral hole (13) as the latch bolt (20) is inserted into the first lateral hole (12).

To secure the base (10) to the computer, the base (10) is attached to the bracket (60) on the computer with the side defining the second lateral hole (13). The stub (31) of the fastener (30) is inserted through the bracket (60) and the second lateral hole (13) in the base (10) and inserted into the third lateral hole (212) in the latch bolt (20) in sequence. The locking hole (311) in the stub (31) is aligned with the locking hole (211) in the latch bolt (20) as the stub (31) is inserted into the third lateral hole (212) in the latch bolt (20). Accordingly, the lock post (51) can extend through the locking hole (311) in the stub (31), such that the fastener (30) can be securely held in the base (10) by the lock post (51). Thereby, the base (10) is securely attached to the bracket (60) by means of the fastener (30) with the lock post (51).

Figure 5:
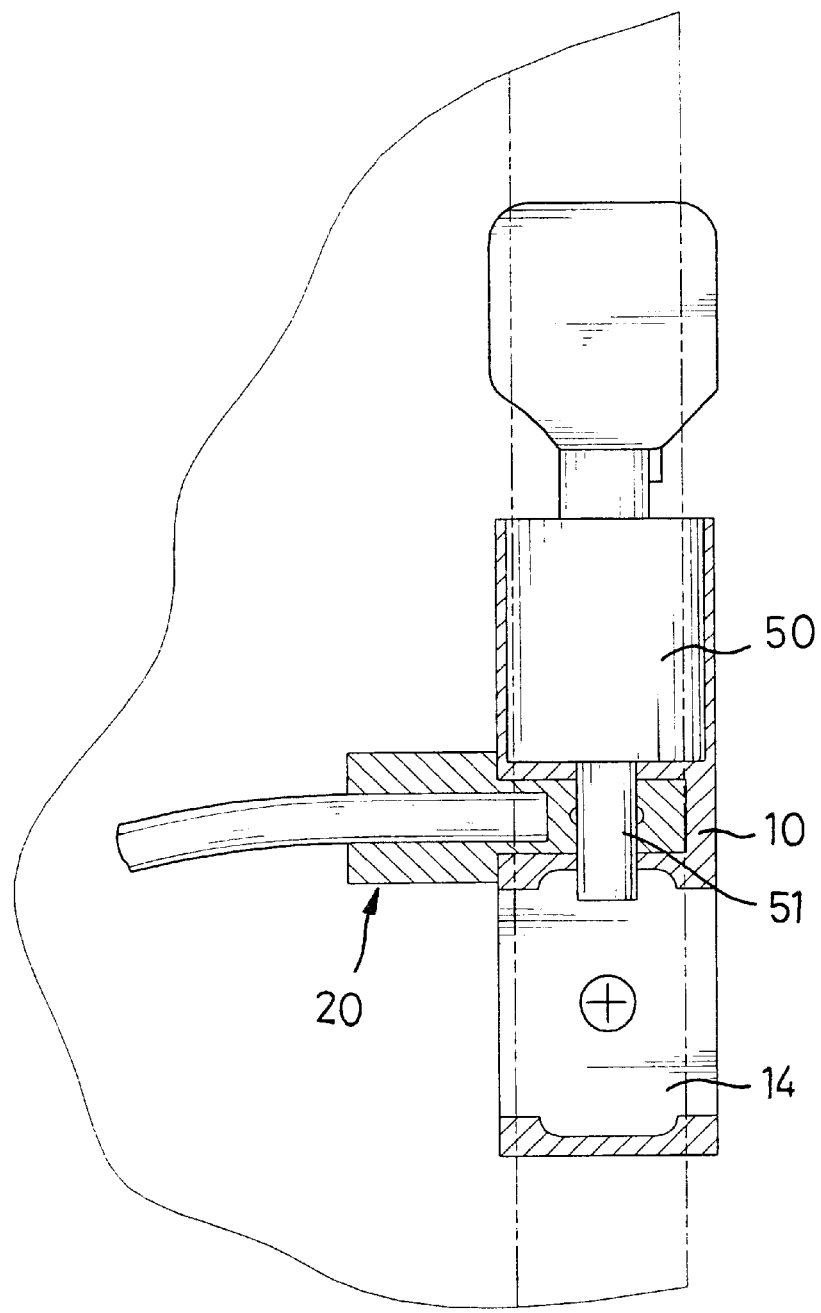
FIG. 5 is a side plan view in partial cross section of the cable lock assembly in FIG. 1 showing that the base is attached to the computer with a bolt.
Figure 6:
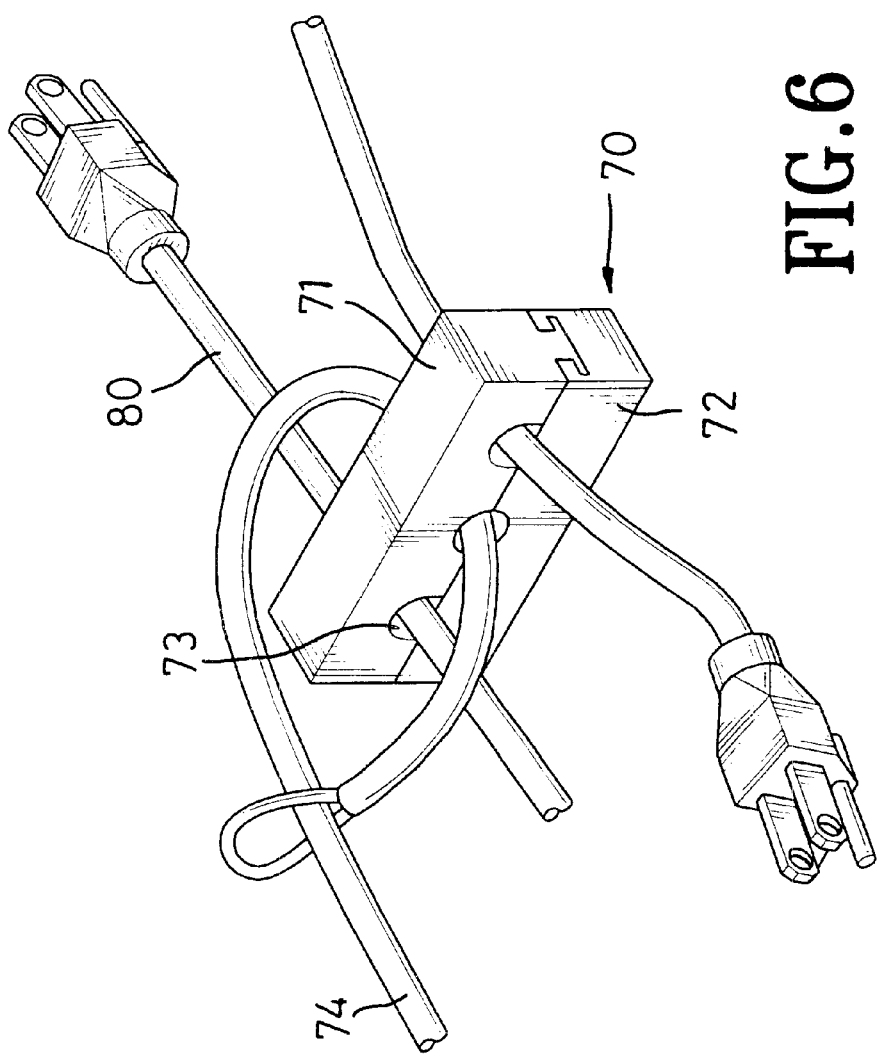
FIG. 6 is a perspective view of a conventional cable lock for a computer in accordance with the prior art.

In another embodiment, with reference to FIGS. 1 and 5, a bore (17) is defined in the face defining the cavity (14). A bolt extends through the bore (17) and is screwed into the computer, such that the base (10) is secured to the computer by means of the bolt.

To lock the computer to an object with the cable lock assembly, with reference to FIGS. 1 to 3, the first end of the cable (22) extends through the loop (24) on the second end of the cable (22) and the cable (22) loops around an object such as a leg of a table. The latch bolt (20) is then inserted into the first lateral hole (12) in the base (10). In the mean-time, the cords of the computer can be held in the notches (42) in the cord holder (40) and the cord holder (40) is then inserted into the cavity (14) in the base (10). To attach the base (10) to the bracket (60) on the computer, the fastener (30) is inserted through the bracket (60) and into the second lateral hole (13) in the base (10). When the user turns the cylinder (50) with a key and actuates the lock post (51) to move outward from the cylinder (50), the lock post (51) can simultaneously extend through the locking holes (211, 311, 43) in the latch bolt (20), the fastener (30) and the cord holder (40). Consequently, the base (10) is secured to the computer, and the cable (22) and the cord holder (40) are locked in the base (10). Accordingly, the computer can be locked to the table with the cable lock assembly. The computer cannot be moved or taken from the table until the cable lock assembly is unlocked even if the cords of the computer are cut off or pulled out from the computer.

In addition, because the fastener (30) is locked by the lock post (51), the base (10) cannot be detached from the bracket (60) until the cylinder (50) is unlocked. Thus, the computer can not be taken away by means of removing the base (10) from the computer. Furthermore, if the base (10) is secured to the computer by a bolt extending through the bore (17) as shown in FIG. 5, the base (10) when removed still cannot be taken away from the computer because the bolt is blocked by the locked cord holder (40). The cable lock assembly can provide an excellent anti-thief effect.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cable lock assembly for a computer comprising:

a base adapted to be attached to the computer;

a cylinder with a lock unit mounted on the base and having a keyhole defined in a first end of the cylinder and a lock post retractably mounted on a second end of the cylinder and inserted into the base, wherein the base has a longitudinal hole defined in a top of the base to receive the cylinder;

a cable detachably connected to the base with a first end and locked by the lock post;

a cord holder detachably attached to the base and locked by the lock post, the cord holder having at least one notch defined in the cord holder at a side facing the base to be adapted for a cord of the computer passing through the at least one notch;

a latch bolt attached to the first end of the cable; and a first lateral hole defined in a face of the base, located below the longitudinal hole and communicating with the longitudinal hole to receive the latch bolt, wherein a locking hole is defined in the latch bolt and aligns with the lock post for the lock post extending into the locking hole as the latch bolt is inserted into the first lateral hole.

2. The cable lock assembly as claimed in claim 1 further comprising a fastener extending into the base and the latch bolt on the cable and comprising:

a head adapted to abut a side of a bracket extending from the computer;

a stub extending from the head, inserted into the base and adapted for extending through the bracket; and a locking hole defined through the stub and aligned with the locking hole in the latch bolt for the lock post extending through the locking hole in the stub, whereby the base is securely attached to the bracket by means of the fastener with the lock of the lock post.

3. The cable lock assembly as claimed in claim 2, wherein a second lateral hole is defined in a side of the base and communicates with the first lateral hole for the stub of the fastener to be inserted into the second lateral hole; and a third lateral hole is defined in a side of the latch bolt and communicates with the locking hole in the latch bolt for the stub of the fastener extending into the third lateral hole in the latch bolt.

4. A cable lock assembly for a computer comprising:

a base adapted to be attached to the computer;

a cylinder with a lock unit mounted on the base and having a keyhole defined in a first end of the cylinder and a lock post retractably mounted on a second end of the cylinder and inserted into the base wherein the base has a longitudinal hole defined in a top of the base to receive the cylinder;

a cable detachably connected to the base with a first end and locked by the lock post; and a cord holder detachably attached to the base and locked by the lock post, the cord holder having at least one notch defined in the cord holder at a side facing the base to be adapted for a cord of the computer passing through the at least one notch, wherein a cavity through opposite faces of the base is defined in a side of the base, located below the longitudinal hole and communicating with the longitudinal hole with a passage to receive the cord holder.

5. The cable lock assembly as claimed in claim 4, wherein a trail is defined in one end of an inner surface of the cavity; and a protrusion protruding from one end of the cord holder and corresponds to the trail in the inner surface of the cavity.

6. The cable lock assembly as claimed in claim 5, wherein a locking hole is defined in a top of the cord bolder for the lock post extending into the locking hole as the cord holder is inserted into the cavity so as to lock the cord holder.

7. The cable lock assembly as claimed in claim 4, wherein a bore is defined in a face defining the cavity for a fastener extending through the bore and screwed into the computer so as to securely attach the base to the computer.

8. The cable lock assembly as claimed in claim 7, wherein the fastener is a bolt.

9. A cable lock assembly for a computer comprising:

a base adapted to be attached to the computer;

a cylinder with a lock unit mounted on the base and having a keyhole defined in a first end of the cylinder and a lock post retractably mounted on a second end of the cylinder and inserted into the base;

a cable detachably connected to the base with a first end and locked by the lock post;

a cord holder detachably attached to the base and locked by the lock post, the cord holder having at least one notch defined in the cord holder at a side facing the base to be adapted for a cord of the computer passing through the at least one notch; and at least one ear extending outward from an edge of the base and adapted to abut a side of the computer to keep the base from rotating relative to the computer.

10. The cable lock assembly as claimed in claim 9, wherein a cavity through opposite faces of the base is defined in a side of the base to receive the cord holder.

11. The cable lock assembly as claimed in claim 10, wherein a trail is defined in one end of an inner surface of the cavity; and a protrusion protruding from one end of the cord holder and corresponding to the trail in the inner surface of the cavity.

12. The cable lock assembly as claimed in claim 11, wherein a locking hole is defined in a top of the cord holder for the lock post extending into the locking hole as the cord holder is inserted into the cavity so as to lock the cord holder.

13. A cable lock assembly for a computer comprising:

a base adapted to be attached to the computer;

a cylinder with a lock unit mounted on the base and having a keyhole defined in a first end of the cylinder and a lock post retractably mounted on a second end of the cylinder and inserted into the base;

a cable detachably connected to the base with a first end and locked by the lock post;

a cord holder detachably attached to the base and locked by the lock post, the cord holder having at least one notch defined in the cord holder at a side facing the base to be adapted for a cord of the computer passing through the at least one notch;

a latch bolt attached to the first end of the cable; and a first lateral hole defined in a face of the base to receive the latch bolt, wherein a locking hole is defined in the latch bolt and aligns with the lock post for the lock post extending into the locking hole as the latch bolt is inserted into the first lateral hole.

14. A cable lock assembly for a computer comprising:

a base adapted to be attached to the computer;

a cylinder with a lock unit mounted on the base and having a keyhole defined in a first end of the cylinder and a lock post retractably mounted on a second end of the cylinder and inserted into the base;

a cable detachably connected to the base with a first end and locked by the lock post; and a cord holder detachably attached to the base and locked by the lock post, the cord holder having at least one notch defined in the cord holder at a side facing the base to be adapted for a cord of the computer passing through the at least one notch, wherein a cavity through opposite faces of the base is defined in a side of the base to receive the cord holder, wherein a bore is defined in a face defining the cavity for a fastener extending through the bore and into the computer so as to securely attach the base to the computer.

15. The cable lock assembly as claimed in claim 14, wherein the fastener is as a bolt.

16. A cable lock assembly for a computer comprising:

a base adapted to be attached to the computer;

a cylinder with a lock unit mounted on the base and having a keyhole defined in a first end of the cylinder and a lock post retractably mounted on a second end of the cylinder and inserted into the base;

a cable detachably connected to the base with a first end and locked by the lock post;

a cord holder detachably attached to the base and locked by the lock post, the cord holder having at least one notch defined in the cord holder at a side facing the base to be adapted for a cord of the computer passing through the at least one notch; and a fastener extending into the base and a latch bolt on the cable and comprising:

a head adapted to abut a side of a bracket extending from the computer;

a stub extending from the head, inserted into the base and adapted for extending through the bracket; and a locking hole defined through the stub for the lock post extending through the locking hole in the stub as the fastener is inserted into the base, whereby the base is securely attached to the bracket by means of the fastener with the lock of the lock post.

* * * * *